United States Patent [19]
Nielsen

[11] Patent Number: 5,854,630
[45] Date of Patent: Dec. 29, 1998

[54] PROSPECTIVE VIEW FOR WEB BACKTRACK

[75] Inventor: Jakob Nielsen, Atherton, Calif.

[73] Assignee: Sun Microsystems, Inc., Palo Alto, Calif.

[21] Appl. No.: 671,296

[22] Filed: Jul. 1, 1996

[51] Int. Cl.[6] ........................ G06F 15/00
[52] U.S. Cl. .............. 345/352; 345/348; 345/357; 345/969
[58] Field of Search .............. 395/326, 327, 395/356, 357, 761, 762, 200.48, 200.57, 200.75; 345/348, 349, 352, 356, 357, 969

[56] References Cited

U.S. PATENT DOCUMENTS

| | | | |
|---|---|---|---|
| 5,297,253 | 3/1994 | Meisel | 345/357 |
| 5,524,201 | 6/1996 | Shwarts et al. | 345/350 |
| 5,625,781 | 4/1997 | Cline et al. | 345/335 |
| 5,706,507 | 1/1998 | Schloss et al. | 395/615 |
| 5,712,979 | 1/1998 | Graber et al. | 395/200.11 |
| 5,717,860 | 2/1998 | Graber et al. | 395/200.12 |
| 5,724,506 | 3/1998 | Cleron et al. | 395/200.11 |
| 5,727,129 | 3/1998 | Barrett et al. | 395/12 |
| 5,737,560 | 4/1998 | Yohanan | 345/349 |

Primary Examiner—Ba Huynh
Attorney, Agent, or Firm—McDermott, Will & Emery

[57] ABSTRACT

When a cursor is placed over a "back" button or a "forward" button, a list of URLs that have been recently visited, is displayed. This enables the user to immediately visualize the information space accessible using the back and forward buttons. Each URL listed is accompanied by a page title or other descriptive information. A user can select one of the URL's on the list and immediately reconnect to that page.

15 Claims, 10 Drawing Sheets

| URL LIST |
|---|
| URL 0 |
| URL 1 |
| URL 2 |
| URL 3 |
| . . . |

PRIOR ART

Figure 3A

| PAGE MEMORY |
|---|
| URL 0 PAGE |
| URL 1 PAGE |
| URL 2 PAGE |
| URL 3 PAGE |
| . . . |

PRIOR ART

| URL | PAGE TITLE |
|---|---|
| URL 0 | WELCOME TO NETSCAPE |
| URL 1 | NET SEARCH ENGINES |
| URL 2 | LYCOS |
| ⋮ | ⋮ |

PROSPECTIVE VIEW FOR WEB BACKTRACK

BACKGROUND OF THE INVENTION

1. Field of the Invention

This invention relates to the field of network browsers and, more particularly to world wide web browsers having "back" and "forward" features which are expanded to facilitate navigation through information space.

2. Description of Related Art

Browsers are known in the art, and particularly network browsers for the world wide web which have "back" and "forward" controls. When navigating information space, a user will connect to a server and to a particular document on the server. Typically such access is accomplished using a hypertext link in which certain words or phrases are keyed to a particular server and a document address. Such a server and document address is known as a uniform resource locator (URL) code.

If a user finds items of interest on any of the documents to which he connects, he may pursue additional information by clicking on hypertext links which direct him to additional information, perhaps on a different server and page. The user follows his interests, connecting with dozens of servers and looking at information from many pages. If a particular server and page to which the user is connected does not interest the user, he may click the "back" button to return back to the previous server and page to find another hypertext link that might be more informative. It is often the case that a user will click back several times and then, after going "back", decide that he really did want to go "forward" to a server from which he had come "back".

When operating in this mode, it is difficult for users to maintain a good mental model of where they are or where they have been in information space. There are simply too many possibilities. As a result, when they contemplate going "back" or going "forward", they may not be aware of what is going to happen if they activate those controls.

It is common for network browsers to store copies of pages downloaded from servers so that the information on the pages can be quickly displayed in the event that a "back" button is pushed. Some browsers do not have this capability, relying instead on the ability to reconnect to the server and page which had been visited previously. If the server is not equipped with page storage, the user will face considerably more delay time in reaching a page previously viewed.

Netscape Navigator™ provides a prospective view for regular hyperlinks in the form of a footer message with the URL that will be retrieved if the user clicks on the link. No such information is provided for the use of the "back" and "forward" buttons. The beta-release of Netscape Navigator 3.0 provides so-called tooltips for the "back" and "forward" buttons, but the information contained in the tips is useless, simply containing the words "back" and "forward" themselves.

3. The Problems

Among other problems, the prior art does not help a network user orient himself as he moves throughout information space. As a result, a user frequently cannot remember the next destination he will encounter when he uses the "back" or "forward" controls. Being required to backtrack through all websites seriatim when desiring to reach a website visited a few sites before is also inefficient.

SUMMARY OF THE INVENTION

The present invention provides apparatus, methods, systems and computer program products which overcome the problems of the prior art described above. In accordance with the invention, the user is provided with a list of URL's which are available for selection and reconnection if a "back" button were invoked together, with information about the title of each page. Similar information is provided for the "forward" button. Thus, by positioning a cursor over either the "back" or "forward" buttons, the user has not only an identification of the URL previously visited. He also has indication of page title.

The invention relates to apparatus for navigating through information space in a network environment, including a computer having a network access port, and browser software running on the computer, the browser software maintaining a list of network addresses to which a user has connected over the network access port and having a user interface implementing back and forward functionality activated by a back button and a forward button, respectively, on a display screen, the browser software displaying the list when a cursor is positioned over the back button or the forward button for a period of time. The back button and the forward button are activated by clicking on the buttons. Connection to a member of the list of network addresses is initiated by clicking on an entry in the list. The list of network addresses includes descriptive information about the respective information found at the network addresses. The list of network addresses includes one or more entries, each entry comprising, a field listing the network address, and a field containing descriptive information about the information found at the network addresses.

The invention is also directed to a computer implemented method of storing information about a path of navigation through information space, by connecting to a network address in information space, and storing the network address in a list together with descriptive information about the content of information located at the address. Connecting to a network address results in entry of the network address connected to as the last entry of the list.

The invention is also directed to a method of connecting a computer to a document stored at a network address to which the computer had been previously connected, by displaying a list of network addresses to which the computer had previously been connected and selecting a member of the list for connection.

The invention is also directed to a system for displaying information, including a network, a plurality of servers connected to the network, each server providing access to one or more pages of information identified by a network address, and one or more computers connected to the network for requesting at least one page from one or more servers in which at least one of the one or more computers displays a list of servers to which connection has been established in response to user input.

The invention is also directed to computer program products for carrying out the techniques of the invention.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
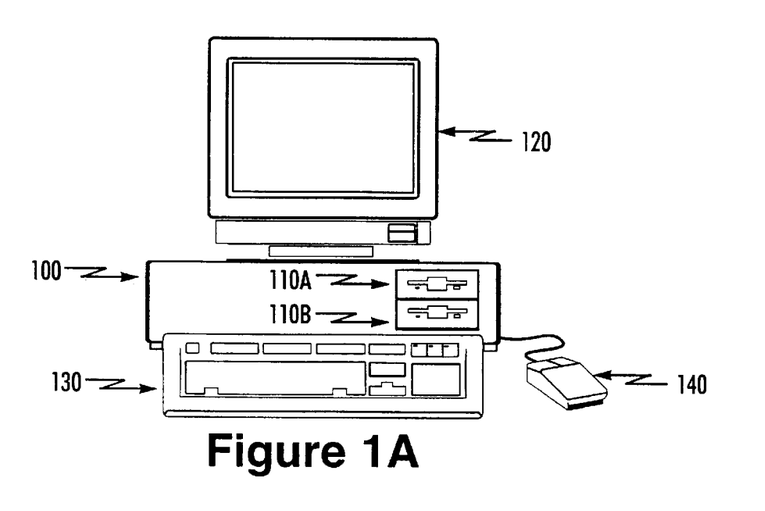
FIG. 1A illustrates a computer of a type suitable for carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
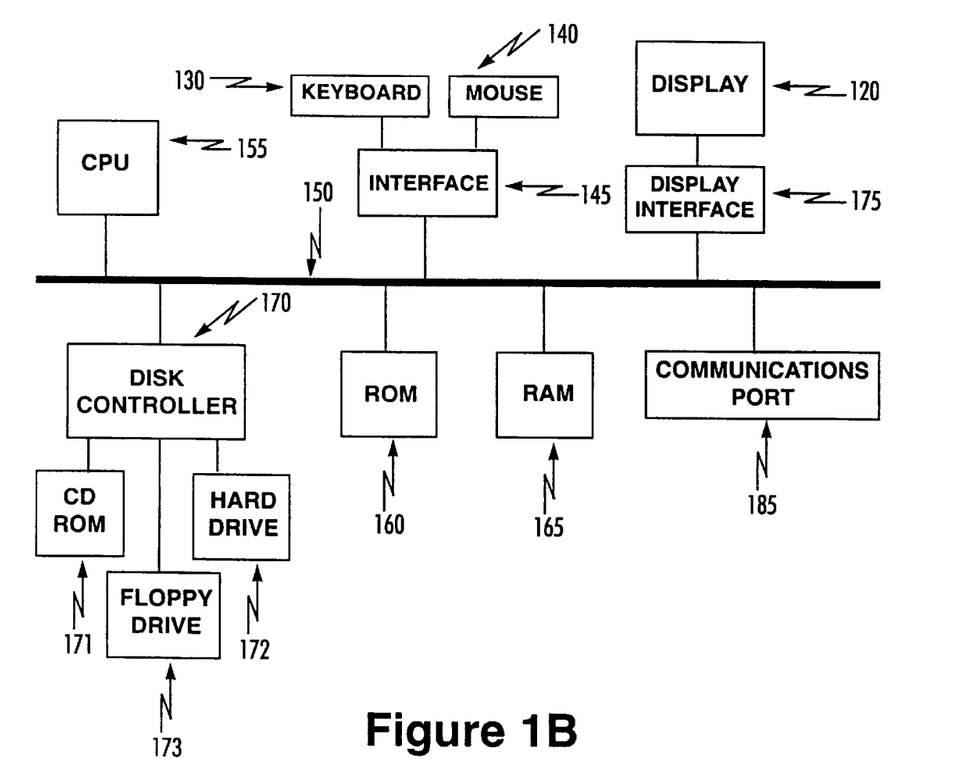
Figure 1B illustrates a block diagram of the computer of FIG. 1A.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a display 120 and permits information from the bus to be viewed on the display. Communications with external devices can occur over communications port 185.

Figure 1C:
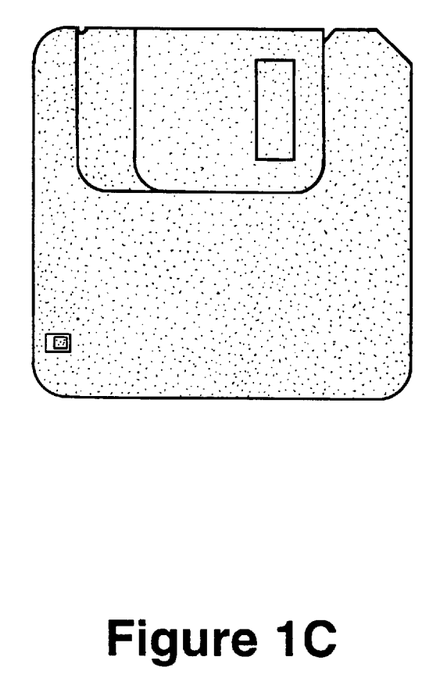
FIG. 1C illustrates an exemplary memory medium containing one or more programs usable with the computer of FIG. 1A.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program information for controlling the computer to enable the computer to perform its functions in accordance with the invention.

Figure 2:
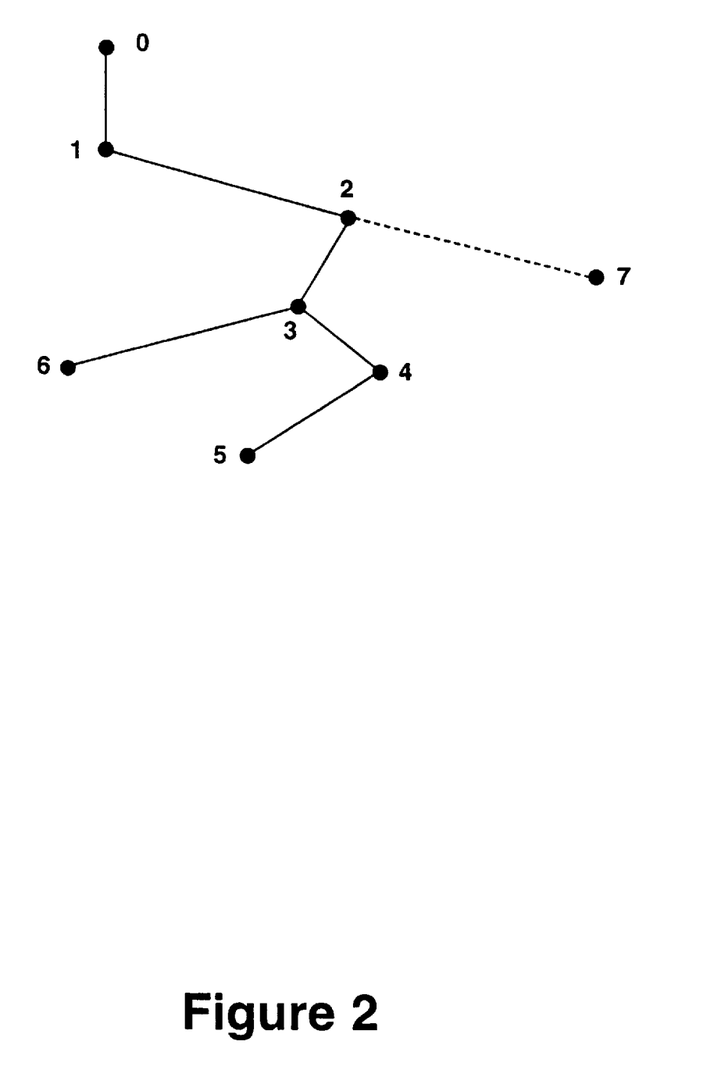
FIG. 2 is an illustration of how nodes might be traversed when navigating an information space.

FIG. 2 is an illustration of how nodes might be traversed when navigating an information space. When one initially opens a network browser for use, the browser connects to a default URL and downloads page information. The user at this point is at node 0 shown in FIG. 2. The user can then enter a URL directly or from a bookmark list or click on a hypertext link which will activate connection to node 1. From there, the user may connect to node 2 then to node 3 then to node 4 then to node 5. At node 5, the user makes a decision to go back to node 4 and activates the "back" button. From there, the user backtracks to node 3 from which, in this example, the user then decides to connect to node 6 utilizing either a hypertext link or a bookmark or a manually entered URL as previously discussed. The process of connecting to nodes and pages in a serial fashion like this is commonly described as navigating an information space.

Figure 3A:
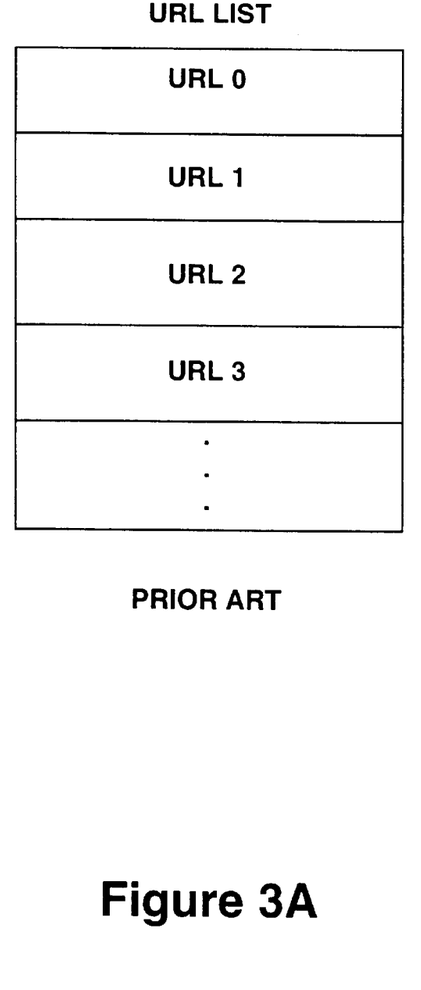
FIG. 3A is an illustration of how a list of notes is maintained in the prior art.

FIG. 3A is an illustration of how a list of nodes is maintained in the prior art. At the time a node identified by a URL is visited, it is added to a URL list as shown in FIG. 3A. Thus, the first few steps of the sequence described in conjunction with FIG. 2 are illustrated, that is, the URL list is shown to have the first four nodes visited by the user in the process of navigating the information space as described in FIG. 2. The number of entries maintained in a list is variable and can be set as a design choice by a user in most cases.

Figure 3B:
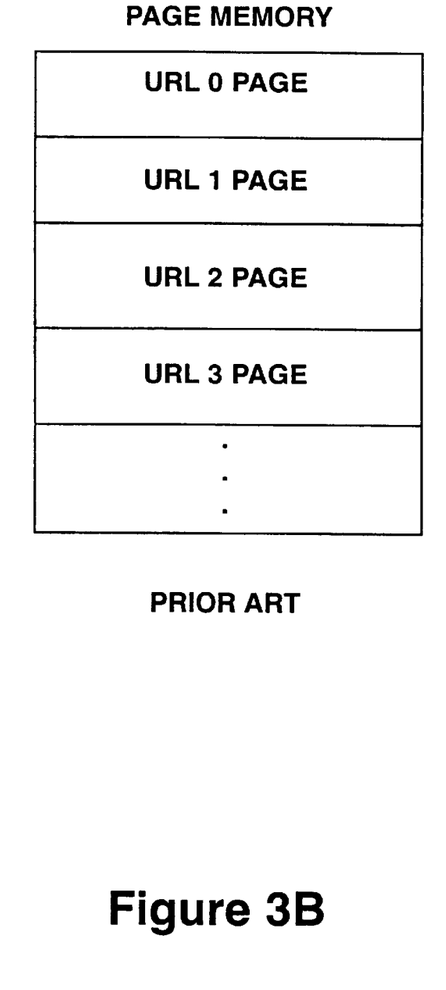
FIG. 3B is an illustration of how pages may be stored in a page memory to facilitate display when using a "back" function.

FIG. 3B is an illustration of how pages may be stored in a page memory to facilitate display when using a "back" function. Connection to a server (node) requires some time and since it takes additional time to download a page from the server selected by the user, some browsers maintain a storage of pages that have been recently visited. In this case, the URL list points to a location in memory where a page corresponding to that URL is stored. Thus, when a user presses a "back" button, the page is already in memory and need not be retrieved from a server again.

Figure 4:
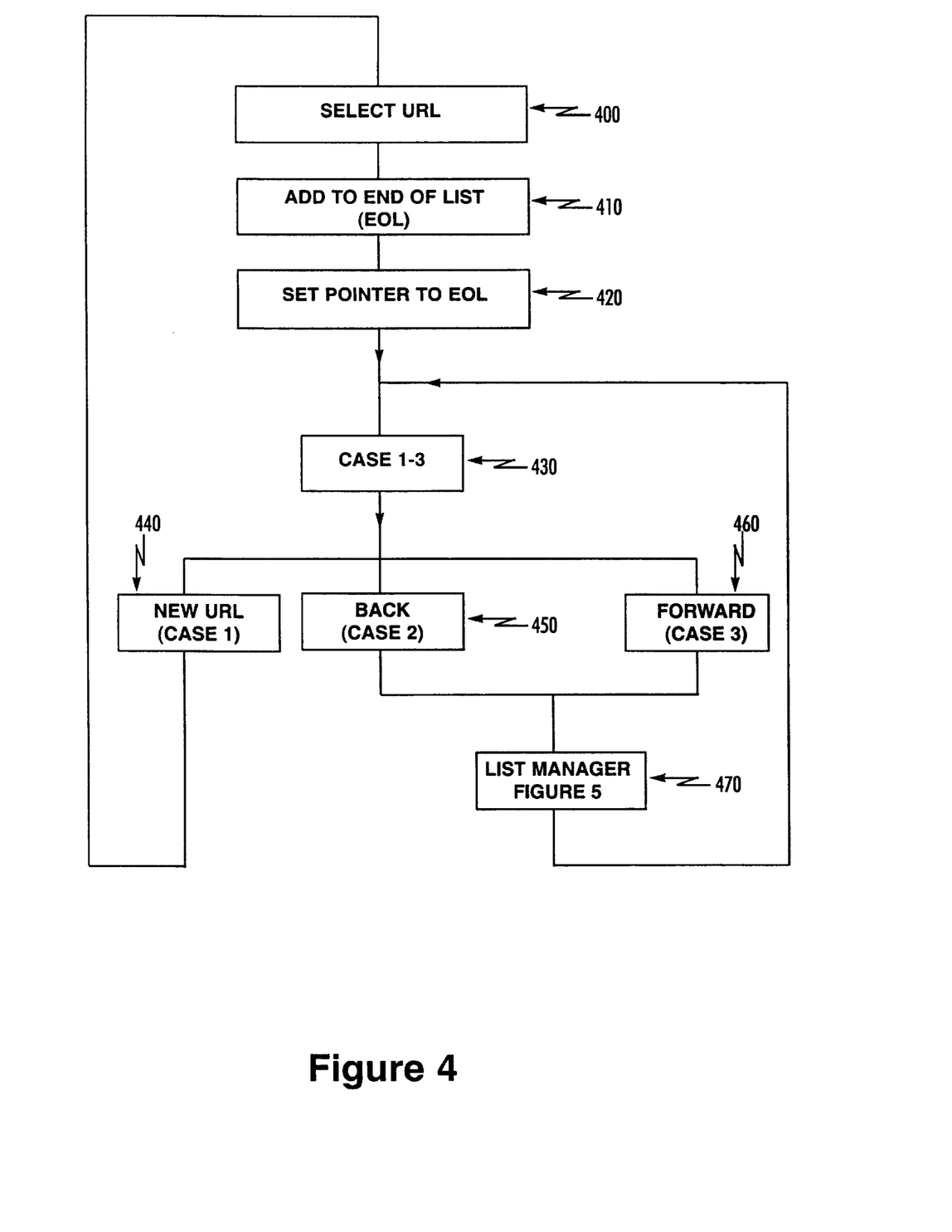
FIG. 4 is a flowchart of a navigation process used in one implementation of the invention.

FIG. 4 is a flowchart of a navigation process used in one implementation of the invention. When a URL is selected for connection (400) or when a default URL is activated as a browser is opened, the URL is added to the end of the list shown in FIG. 3A (410). At that time, a pointer is also set to the end of list location (420). Three things can then happen (430). If a new URL is selected, either by activating a hypertext link or by manually entering the URL, (440) the process loops back to the beginning before block 400. If a "back" button is activated (450) or if a "forward" button is activated (460), the list manager process shown in FIG. 5 is called.

Figure 5:
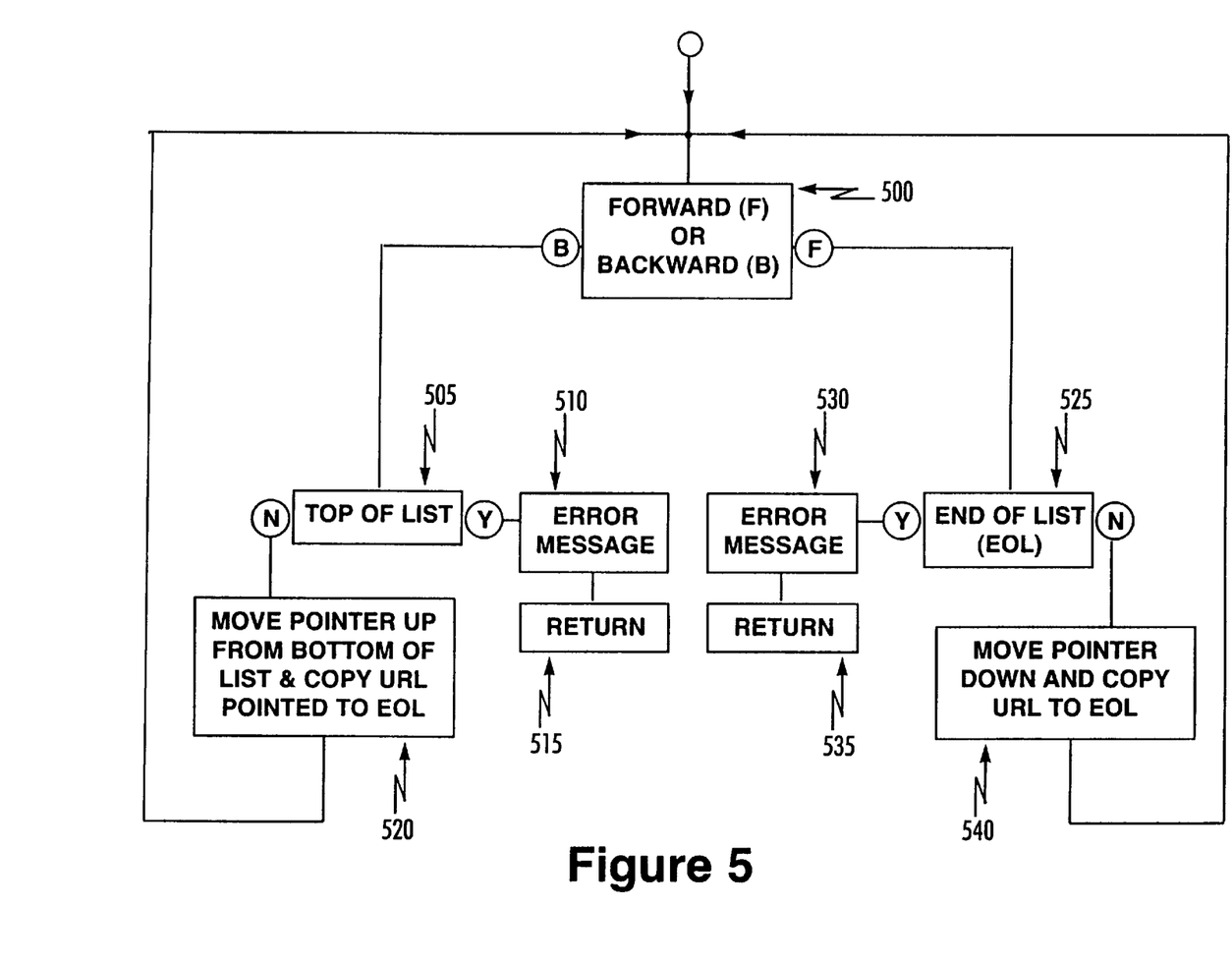
FIG. 5 is a flowchart of a list manager process shown in FIG. 4.

FIG. 5 is a flowchart of a list manager process shown in FIG. 4. A determination is made whether the button activated is a "forward" button or a "back" button (500). If it is a "back" button (500-B), a check is made to see if the pointer is already at the top of the list (505). If it is, an error message (510) is sent to the user and the process returns (515). If the pointer is not already at the top of the list (505-N), the pointer is moved up one URL on the list of the URLs and the value pointed to for the URL is added to the end of the list (520) and the process returns to its starting point. If a "forward" button has been selected (500-F), a check is made to see if the pointer is at the end of list (525). If it is, (525-Y) an error message (530) is sent and the process returns (535). If the pointer is not at the end of the list (525-N) the pointer is moved down one URL and that URL is copied to the end of the list (540) and the process returns to the beginning.

Figure 6A:
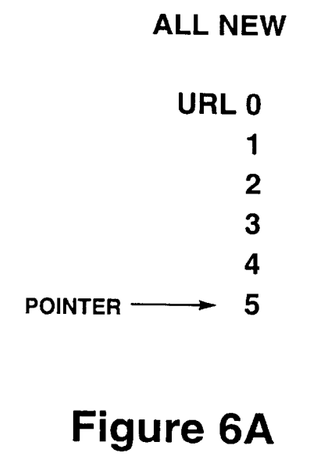
FIGS. 6A–6E illustrate the operation of list management as implemented in FIG. 5 during navigation through information space.
Figure 6B:
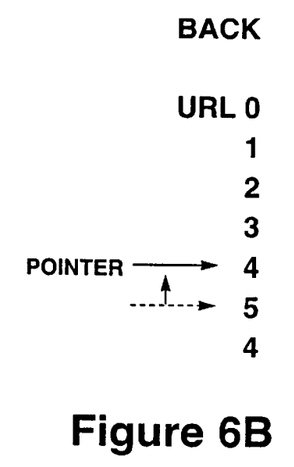
Figure 6C:
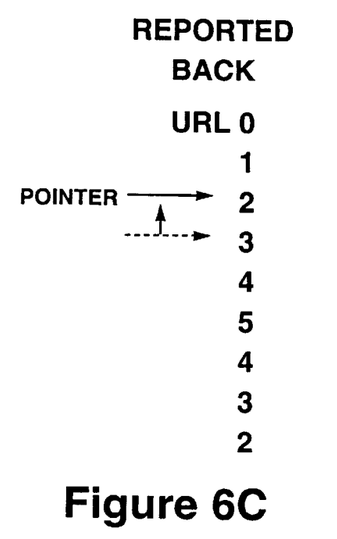
Figure 6D:
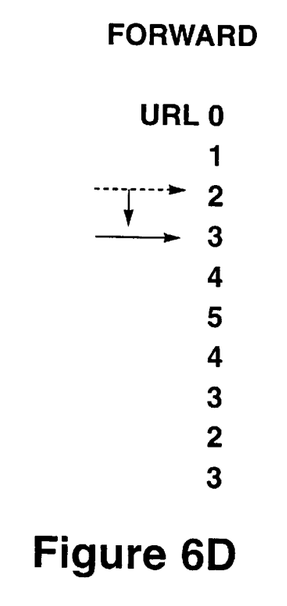
Figure 6E:
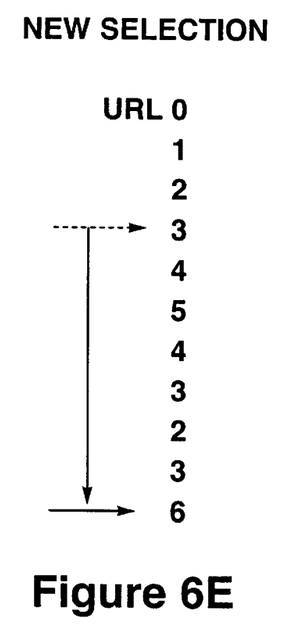

FIGS. 6A–6E illustrate the operation of list management as implemented in FIG. 5 during navigation through information space, using portions of the example illustrated in conjunction with FIG. 2. FIG. 6A illustrates the condition of the list after the first URL's have been accessed. Each node activated has been activated as a new URL until the node 5 has been reached. The pointer therefor points to node 5. In FIG. 6B, the "back" button has been activated to move back one URL. As shown in FIG. 6B, the pointer moves from pointing to node 5 to pointing to node 4 and the value in node 4 (i.e., the URL of node 4) is copied to the end of the list. In FIG. 6C, repeated applications of the "back" function have resulted in a stepping of the pointer to node 2, and the addition of nodes 3 and 2 to the end of the list. FIG. 6D shows activation of the "forward" button position shown in FIG. 6C to that shown in 6D that is, the user, seeing a page from node 2 in FIG. 6C decides to go "forward" to the next node it had previously visited, namely node 3. FIG. 6E shows the transition which occurs when the user, at node 3, decides to enter a completely new node by activating a hypertext link, instead of using the "back" or "forward" functions. In this case, the URL for node 6 is entered at the end of the list and the pointer is moved to a point directly to that node at the end of the list. In this manner, the process of FIG. 5 keeps track of where the browser has been in the information space.

One should note that the term "back" means "back" with reference to a movement on the list. The term, however, is somewhat ambiguous. In another meaning, "back" can mean higher up the section tree shown in FIG. 2. As shown in FIG. 2, if one were at node 6, having traversed the path to get there is previously discussed, and one wish to go back to node 3 one would push a "back" button and arrive at node 3. This operation is described in conjunction with FIG. 6. If the user arrived at node 3 from node 4, pressing the button "back" as discussed in the examples above, would result in the user going to node 4, and not to node 2. However, in a different implementation, the term "back" could be interpreted as meaning "up to a higher level" on the section tree illustrated in FIG. 2, rather than to the node from which you arrived at point 3. Thus, in the alternative implementation, pressing "back" at node 3, would result in moving to node 2, rather than back to node 4 as shown in the example utilized in this application. Regardless of which methodology is selected for implementation, the principles of the invention still apply.

Figure 7:
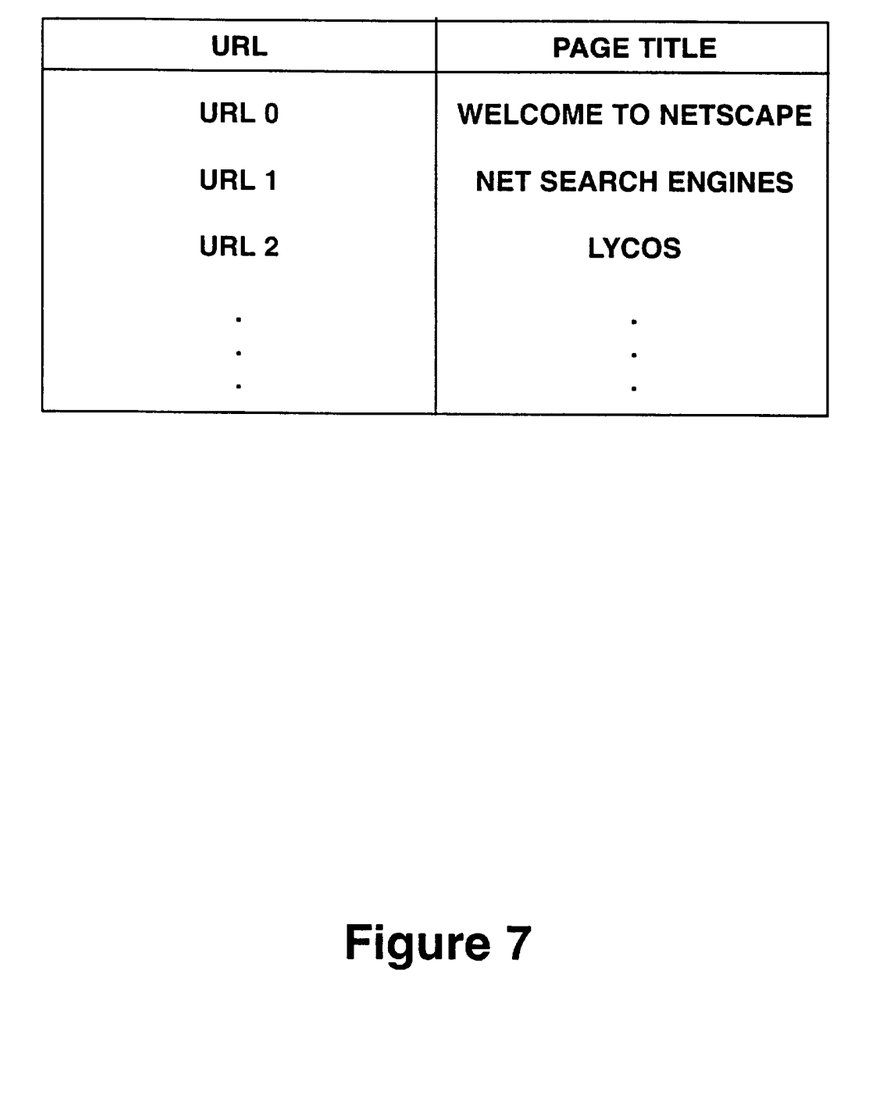
FIG. 7 is an illustration of a preferred list format used in conjunction with the invention.

FIG. 7 is an illustration of a preferred list format used in conjunction with the invention. In FIG. 7, the URL list of the prior art has been improved upon by adding page title information to each URL. Thus, as shown in FIG. 7, each URL is accompanied by title information for the page represented by the URL. The order of occurrence of the fields shown in FIG. 7 is not important, and it may be preferred to show the page title with the URL following in parenthesis. If the page does not have a title, then the text from the first <H1>markup is used if available. If no <H1>heading is present in the page, the text from the first <H2>markup is used if available. If no <H2>heading is available, then no title information is given and the only information displayed is the URL for the page. In this latter case, the URL is not enclosed in parenthesis.

Figure 8:
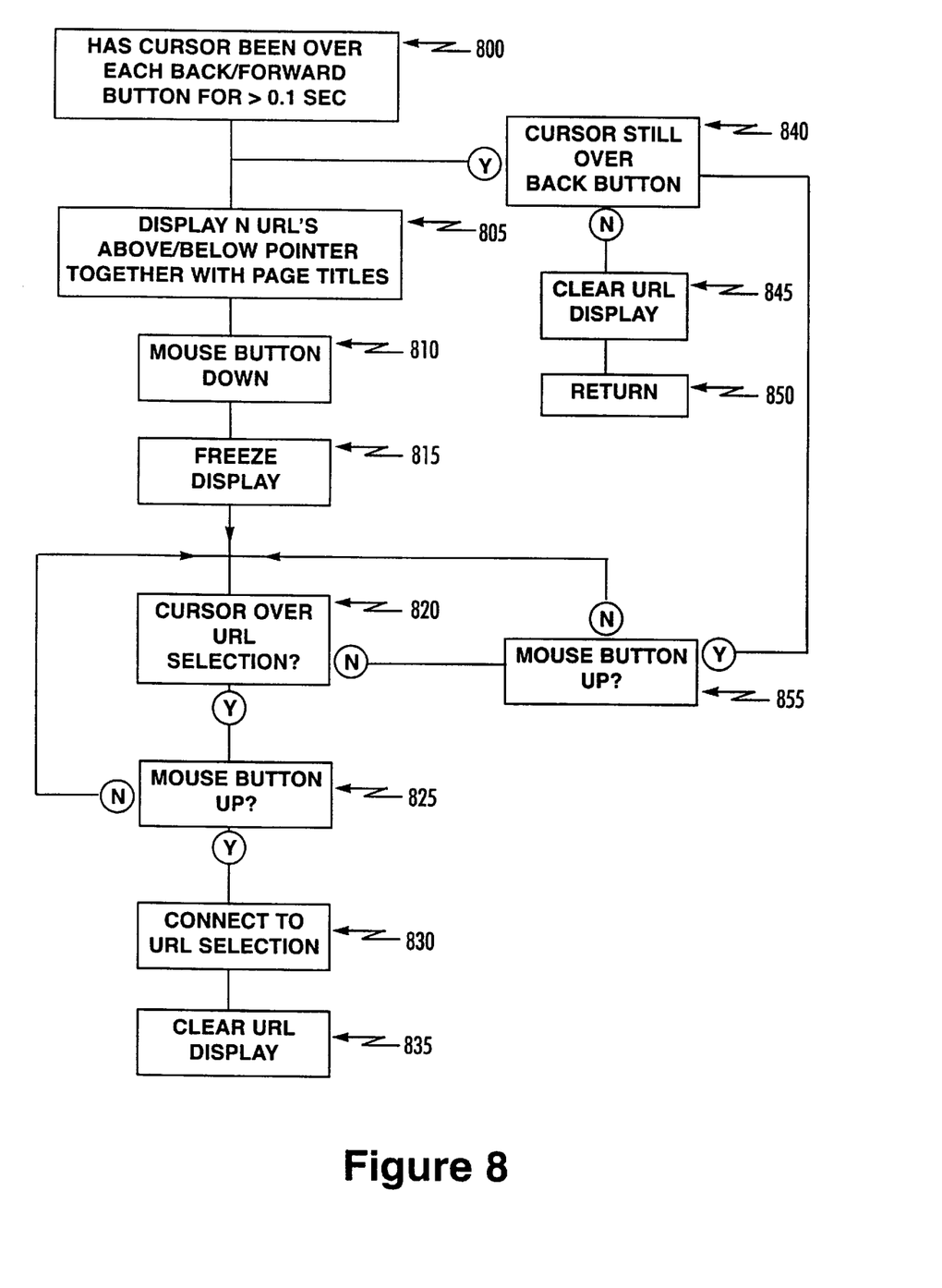
FIG. 8 is a flowchart of a process for displaying navigational information in conjunction with a "back" and "forward" buttons in accordance with the invention.

FIG. 8 is a flowchart of a process for displaying navigational information in conjunction with "back" and "forward" buttons in accordance with the invention. If the cursor is situated over a "back" or "forward" button for a period of time in excess of one tenth of a second (800) n URL entries, as shown in FIG. 7, above or below the pointer are displayed (805). At that time, the user may press a mouse down button and if the user does so (810) the display of URL items is frozen (815). While frozen, the cursor can be moved to select a particular URL for activating a connection and a display of the URL page associated with that selection (820). If the cursor is located over a URL selection, (820-Y) and the mouse button is released (825-Y), a connection to the URL selection will be undertaken (830) and the URL display will be cleared (835). However, if the cursor is not over a URL selection (820-N) and the mouse button is released, (855-Y), a check will be made to see if the cursor is still over the back (or forward) button (840) and if it is (840-Y) the process will loop back to before block 805. If it is not (840-N) the URL display will be cleared (845) and the process will return (850). If the cursor is not over the URL section (820-N) and the mouse button has not been released (855-N) the process will loop back to before block 820.

Figure 9:
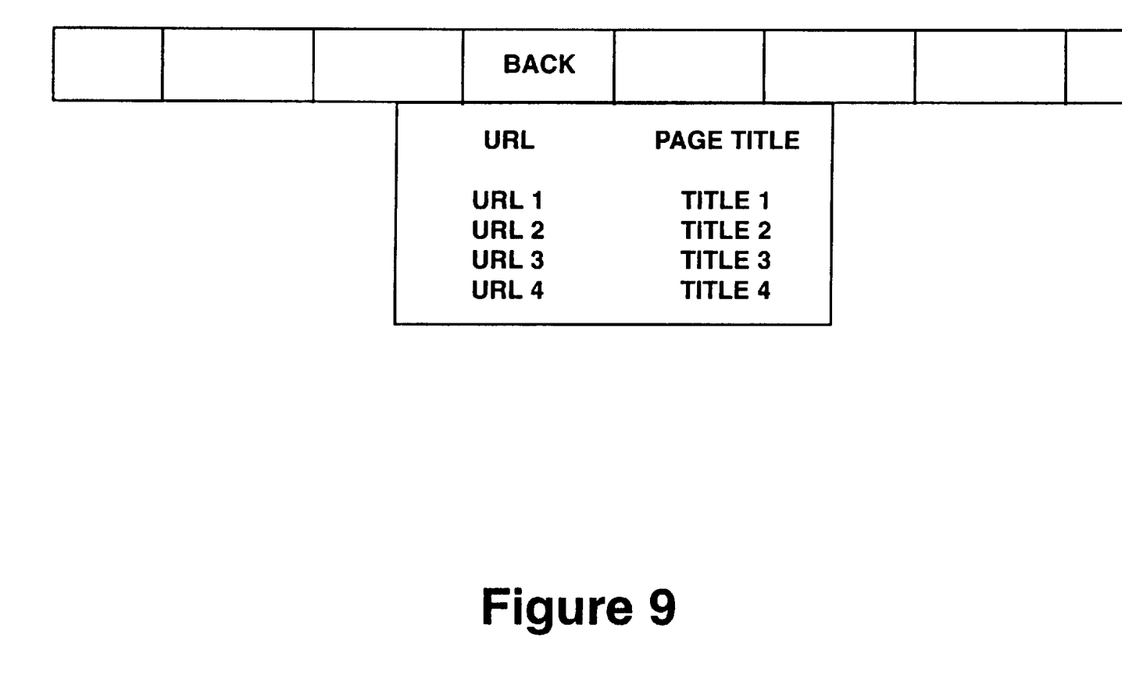
FIG. 9 is an illustration of how navigational information is displayed in conjunction with a "back" button.

The process described in conjunction with FIG. 8 reflects the preferred location for the information. As illustrated in FIG. 9, the preferred location is as a tooltip located immediately under the "back" or "forward" button, respectively. Alternatively, the information can be displayed in a footer.

In the example shown in FIG. 9, navigational information is displayed in conjunction with a "back" button as an example.

Thus, in accordance with the principles of the invention, a user's ability to navigate information space is greatly enhanced and the ability of network browsers is improved.

Thus, using the techniques of the invention disclosed herein, internationalized software can be developed and tested at much lower cost and with greater efficiency than was heretofore possible.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. Apparatus for navigating through information space in a network environment, comprising:

a. a computer having a network access port;

b. browser software running on said computer, said browser software maintaining a list of network addresses to which a user has connected over said network access port and having a user interface implementing back and forward functionality activated by a back button and a forward button, respectively, on a display screen, said browser software displaying said list when a cursor is positioned over said back button or said forward button for a period of time.

2. Apparatus of claim 1 in which said back button and said forward button are activated by clicking on said buttons.

3. Apparatus of claim 1 in which connection to a member of said list of network addresses is initiated by clicking on an entry in said list.

4. Apparatus of claim 1 in which said list of network addresses includes descriptive information about the respective information found at said network addresses.

5. Apparatus of claim 1 in which said list includes one or more entries, each entry comprising:

a field listing the network address;

a field containing a pointer to a stored page of information; and a field containing descriptive information about the information found at the network addresses.

6. The apparatus of claim 1 wherein activation of said back functionality by said back button connects to a last user-connected network address on said list.

7. The apparatus of claim 1 wherein activation of said back functionality by said back button connects to a higher level of a previously user-connected network address on said list.

8. The apparatus of claim 1 wherein activation of said forward functionality by said forward button connects to a lower level of a previously user-connected network address on said list.

9. The apparatus of claim 1 wherein activation of said forward functionality by said forward button connects to a higher level of a previously user-connected network address on said list.

10. The apparatus of claim 4 wherein said descriptive information comprises title page information regarding said user-connected network address.

11. The apparatus of claim 5 wherein said descriptive information comprises title page information regarding said user-connected network address.

12. The apparatus of claim 4 wherein said descriptive information comprises a first markup heading regarding said user-connected network address if said user-connected network address does not contain any title page information.

13. The apparatus of claim 5 wherein said descriptive information comprises a first markup heading regarding said user-connected network address if said user-connected network address does not contain any title page information.

14. The apparatus of claim 4 wherein said descriptive information comprises a second markup heading regarding said user-connected network address if said user-connected network address does not contain at least one of a first markup heading and any title page information.

15. The apparatus of claim 5 wherein said descriptive information comprises a second markup heading regarding said user-connected network address if said user-connected network address does not contain at least one of a first markup heading and any title page information.

* * * * *